United States Patent [19]
Wells et al.

[11] Patent Number: 5,135,238
[45] Date of Patent: Aug. 4, 1992

[54] LUBRICATED PUMP PACKING ASSEMBLY

[75] Inventors: John R. Wells, Comanche; Steven A. Box, Duncan, both of Okla.

[73] Assignee: Halliburton Company, Duncan, Okla.

[21] Appl. No.: 641,982

[22] Filed: Jan. 16, 1991

[51] Int. Cl.$^5$ .............................................. F16J 15/18
[52] U.S. Cl. ...................................... 277/71; 277/15; 277/29; 277/59; 277/77; 277/112
[58] Field of Search ................... 277/3, 15, 16, 19, 28, 277/29, 59, 60, 70, 71, 72 R, 73, 77, 102, 110, 112, 116.4, 124, 125

[56] References Cited

U.S. PATENT DOCUMENTS

| | | | |
|---|---|---|---|
| 2,486,939 | 11/1949 | Freund | 277/71 |
| 3,054,619 | 9/1962 | Peirotti | 277/59 |
| 3,209,830 | 10/1965 | Orr et al. | 166/84 |
| 3,288,473 | 11/1966 | Hinds | 277/72 |
| 3,514,114 | 5/1970 | Monahan | 277/71 |
| 3,678,809 | 7/1972 | Doutt | 277/71 |
| 3,776,558 | 12/1973 | Maurer et al. | 277/9 |
| 3,907,307 | 9/1975 | Maurev et al. | 277/71 |
| 3,939,910 | 2/1976 | Bruce | 166/84 |
| 3,967,678 | 7/1976 | Blackwell | 166/84 |
| 4,085,941 | 4/1978 | Wilkinson | 277/71 |
| 4,247,121 | 1/1981 | Bergman | 277/15 |
| 4,321,975 | 3/1982 | Dyer | 175/206 |
| 4,345,766 | 8/1982 | Turanyi | 277/30 |
| 4,474,382 | 10/1984 | Hjelsand | 277/59 |
| 4,530,397 | 7/1985 | Calhoun | 166/84 |
| 4,665,976 | 5/1987 | Retherford | 166/93 |
| 4,758,135 | 7/1988 | Woodward et al. | 277/71 |
| 4,781,553 | 11/1988 | Nomura et al. | 277/71 |
| 4,872,508 | 10/1989 | Gordon | 166/84 |

Primary Examiner—William A. Cuchlinski, Jr.
Assistant Examiner—D. DePumpo
Attorney, Agent, or Firm—James R. Duzan; Neal R. Kennedy

[57] ABSTRACT

A lubricated packing assembly for a reciprocating pump. The packing assembly includes a packing ring for sealingly engaging the pump plunger. A seal carrier is disposed adjacent to the packing ring. A vent zone is defined between the packing ring and a vent passage extending longitudinally through the seal carrier. The vent zone includes grooves on inner and outer surfaces of the seal carrier and a hole interconnecting the grooves. This hole is in communication with the vent passage. A lubrication passage is also provided in the seal carrier, and a seal is positioned on opposite sides of the lubrication passage. Lubricant is provided to the plunger between the seals. The lubrication passage and the vent passage are isolated from one another so that communication therebetween is prevented. In this way, leakage past the packing ring is vented without contaminating the lubricant so that pressure from the pumped fluid cannot stop lubricant flow.

20 Claims, 1 Drawing Sheet

LUBRICATED PUMP PACKING ASSEMBLY

BACKGROUND OF THE INVENTION

1. Field Of The Invention

This invention relates to lubricated packing assemblies for reciprocating pumps, and more particularly, to a pump packing assembly wherein discharge fluid blowby across the packing is vented to the atmosphere by a venting zone which is separated from a lubrication portion of the assembly.

2. Description Of The Prior Art

Reciprocating pumps require packing to seal along the pump plunger or piston rod to prevent or at least minimize leakage of the fluid being pumped. Frequently, a lubricant is provided to the packing to lubricate between the packing and the plunger or piston rod. Of course, this is done to increase packing life.

A problem occurs where the pumped fluid is incompatible with the lubricant and/or where the discharge pressure of the pump exceeds the lubrication pressure which is frequently the case. Leakage of the pumped fluid into the lubricant can dilute the lubricant, thereby reducing its effectiveness. Also, the pressure from the pumped fluid can stop the flow of lubricant altogether so that no film of lubricant is provided between the packing and the plunger or piston rod.

One solution is to separate the portion of the packing assembly which seals the pumped fluid from the portion which provides lubrication to the plunger or piston rod. In this way, any leakage of the pumped fluid may be drained before it contaminates the lubricant or pressurizes any lubrication annulus. That is this separation would prevent pumped fluid pressure from shutting off lubrication.

One apparatus which generally shows these features is the stuffing box disclosed in U.S. Pat. No. 3,054,619 to Pierotti. In this device, packing is used to seal on a pump plunger, and a collection ring is disposed adjacent to the packing. The collection ring has drainage openings therein to avoid splashing of fluid out of the top of the stuffing box. Spaced sealing rings are positioned above the collection ring, and lubrication is provided through an opening between the sealing rings.

A problem with the apparatus of Pierotti is that it requires a relatively large number of parts, including the collection ring and other components to hold the packing and sealing rings in place. In the present invention, a single-piece seal carrier or gland is provided which hods lubrication seals and includes a lubrication passage between the seals and a generally longitudinally extending drain or vent passage which is not in communication with the lubrication passage.

The apparatus of Pierotti also does not provide any means to directly drain leakage around the outside of the packing. The present invention provides a vent zone for both the inside and outside of the packing which is in communication with the vent passage.

SUMMARY OF THE INVENTION

The lubricated pump packing assembly of the present invention is a packing apparatus designed for use in a reciprocating plunger pump. The packing apparatus comprises packing means for sealingly engaging the plunger of the pump and a seal carrier disposed adjacent to the packing means. The seal carrier comprises seal receiving means for receiving a seal therein, a vent passage defined through the seal carrier without communication with the seal receiving means, the vent passage being adapted for venting leakage of fluid past the packing means, and a lubrication passage defined in the seal carrier without communication with the vent passage, the lubrication passage being adapted for providing lubrication to the plunger adjacent to the seal receiving means. The apparatus further comprises sealing means disposed in the seal receiving means for sealingly engaging the plunger and allowing a film of lubricant from the lubrication passage to be deposited on the plunger.

In the preferred embodiment, the sealing means comprises a pair of spaced seals positioned on opposite sides of the lubrication passage, and each of the seals has a resilient lip thereon. These resilient lips are positioned in opposite directions.

The apparatus may also be said to comprise packing means for sealingly engaging the plunger of the pump and a gland adjacent to the packing means and defining a vent zone or chamber therein. The vent zone comprises a groove defined on an outer surface of the gland in communication with an outer portion of the packing means, a groove defined on an inner surface of the gland in communication with an inner portion of the packing means, and a hole interconnecting the grooves such that fluid leakage past the packing means moves toward the hole. The hole is preferably in communication with a vent passage also defined in the gland.

Clamping means may be provided for clamping the packing means and seal carrier or gland together in an operating position within the pump. The packing means and seal carrier gland may be disposed in a packing sleeve, such that the clamping means clamps the components within the packing sleeve.

An important object of the invention is to provide a pump packing assembly wherein leakage past the pump packing is prevented from communication with lubrication to the pump plunger.

Another important object of the invention is to provide a single-piece seal carrier which allows venting of leakage past the pump packing and has a pair of lubrication seals therein which are disposed on opposite sides of a lubrication passage.

A further object of the invention is to provide a packing assembly wherein pump fluid pressure will not stop lubrication of the pump plunger.

Additional objects and advantages of the invention will become apparent as the following detailed description of the preferred embodiment is shown in conjunction with the drawings which illustrate such preferred embodiment.

DESCRIPTION OF THE PREFERRED EMBODIMENT

Figure 1:
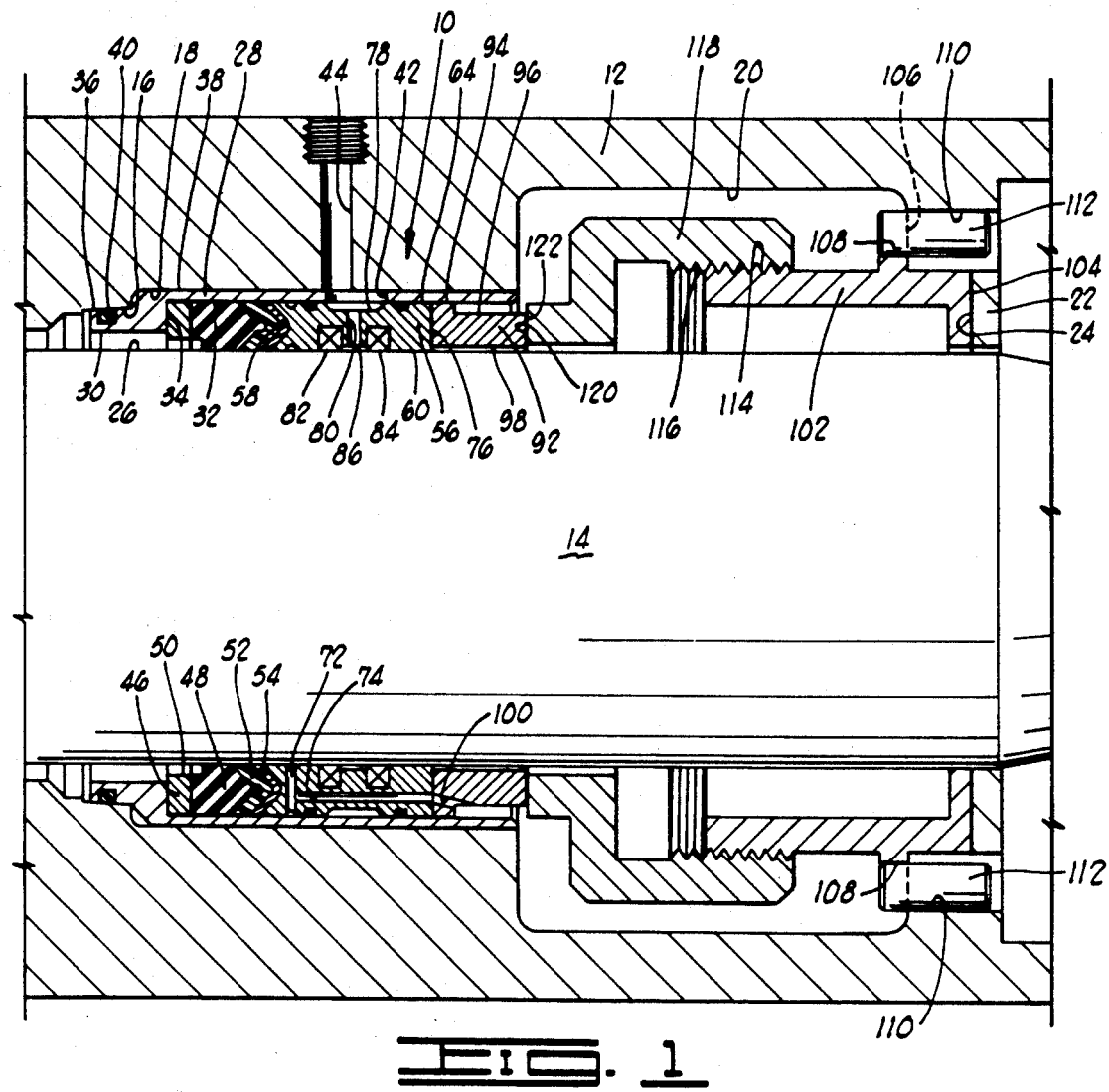
FIG. 1 is a cross-sectional view of a portion of a plunger pump having the lubricated pump packing assembly of the present invention.

Referring now to the drawings, and more particularly to FIG. 1, the lubricated pump packing assembly of the present invention is shown and generally designated by the numeral 10. Packing assembly 10 is disposed in a pump fluid end body 12 of a kind known in the art having a plunger 14 reciprocably disposed therein. The remainder of the pump is also known and therefore not shown.

Fluid end body 12 has a tapered bore 16 therein adjacent to a first end of a larger substantially cylindrical bore 18. At the opposite end of bore 18, fluid end body 12 defines a recess 20 which extends radially outwardly from bore 18. At an end of recess 20 opposite bore 18, fluid end body 12 has an inwardly extending flange 22 with a shoulder 24 thereon.

Plunger 14 has a smooth outside diameter 26 which is spaced inwardly from fluid end body 12. It will be seen that an annular gap is thus defined between bore 18 in fluid end body 12 and outside diameter 26 of plunger 14. The main portion of packing assembly 10 is disposed in this annular gap.

Packing assembly 10 preferably comprises a packing sleeve 28 which has a first bore 30 and a larger second bore 32 therein. A shoulder 34 extends between first bore 30 and second bore 32. Packing sleeve 28 also has a tapered outside surface 36 which is sized to fit within tapered bore 16 and an outside diameter 38 which is in close relationship to bore 18 in fluid end body 12.

A sealing means, such as O-ring 40, provides sealing engagement between packing sleeve 28 and fluid end body 20.

Packing sleeve 28 further defines a substantially transverse opening 42 therein which is at least partially aligned with a lubrication port 44 in fluid end body 12.

A spacer ring 46 is disposed in packing sleeve 28 adjacent to shoulder 34. A header ring 48 is positioned against spacer ring 46. Spacer ring 46 has an inside diameter 50 which is sized so that the spacer ring provides adequate support for header ring 48. In an alternate embodiment, spacer ring 46 may be omitted so that header ring 48 bears directly on shoulder 34 in packing sleeve 28.

Packing assembly 10 comprises packing means for sealingly engaging plunger 14. In the preferred embodiment, the packing means is characterized by a high pressure packing ring 52, also simply referred to as packing 52, which is engaged with header ring 48. Packing 52 sealingly engages outside diameter 26 of plunger 14 and second bore 32 in packing sleeve 28. On the longitudinally opposite side of packing 52 is an anti-extrusion ring 54 which supports the packing.

Header ring 48, packing 52, and anti-extrusion ring 54 are all of a kind known in the art.

Figure 2:
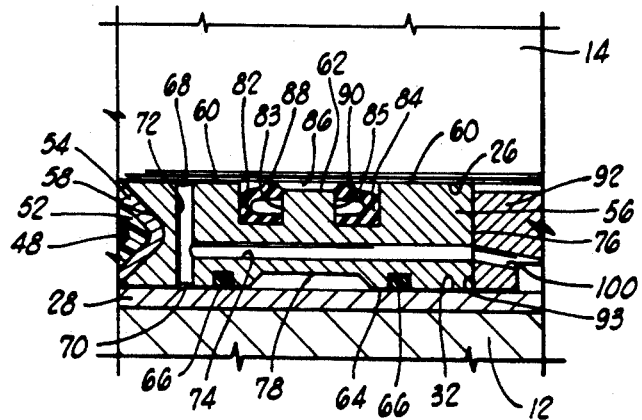
FIG. 2 is an enlarged detail of a portion of the pump packing of FIG. 1 showing a venting zone and a lubrication annulus between two lubricant seals.

A single-piece seal carrier or gland 56 is positioned adjacent to anti-extrusion ring 54 and has an annular, curved groove 58 defined in one end thereof which is adapted for receiving the anti-extrusion ring therein. Referring to FIG. 2, seal carrier 56 has a first bore 60 therein which is sightly larger than outside diameter 26 of plunger 14. Seal carrier 56 also has a slightly larger second bore 62 therein.

Seal carrier 56 further has an outside diameter 64 which is adapted for close, spaced relationship with second bore 32 in packing sleeve 28. A sealing means, such as a pair of spaced O-rings 66, provide sealing engagement between seal carrier 56 and packing sleeve 28.

Still referring to FIG. 2, seal carrier 56 defines an inner annular groove 68 in first bore 60 thereof and a similar outer annular groove 70 in outside diameter 64 thereof. A substantially transversely extending hole or passage 72 interconnects inner groove 68 and outer groove 70. Inner annular groove 68, outer annular groove 70 and transverse hole 72 may be said to form a vent zone or chamber. A longitudinal vent hole or passage 74 extends from transverse hole 72 to distal end 76 of seal carrier 56. It will be seen that longitudinal vent hole 74 is spaced radially inwardly from O-rings 66.

Referring again to FIG. 1, seal carrier 56 defines an annular recess 78 in outside diameter 64. Recess 78 is substantially aligned with opening 42 in packing sleeve 28, and is thus in communication with lubrication port 44. It will be seen that recess 78 is spaced radially outwardly from longitudinal vent hole 74, as best seen in FIG. 2. A transverse lubrication hole or passage 80 extends between recess 78 and second inside diameter 62 of seal carrier 56. As seen in FIG. 1, longitudinal vent hole 74 and transverse lubrication hole 80 extend through different portions of seal carrier 56 such that they are isolated from one another. That is, communication is prevented between vent hole 74 and lubrication hole 80.

Disposed on opposite sides of transverse hole 80 are a first seal 82 disposed in a first groove 83 defined in seal carrier 56 and a second seal 84 disposed in a second groove 85 defined in the seal carrier. Thus, grooves 83 and 85 may be said to characterize one embodiment of a seal receiving means in seal carrier 56.

First and second grooves 83 and 85 are spaced radially inwardly from longitudinal vent hole 74, as best seen in FIG. 2, such that communication between the vent hole and seals 82 and 84 is prevented.

First and second seals 82 and 84 ar adapted for sealing engagement with outside diameter 26 of plunger 14 such that a lubrication annulus 86 is defined therebetween. Lubrication annulus 86 is bounded on the outside by second bore 62 in seal carrier 56 and on the inside by outside diameter 26 of plunger 14.

First and second seals 84 and 82 are preferably wiper rings of a known construction, although other types of seals would also be satisfactory. Preferably, first seal 82 has a sealing lip 88, and similarly, second sea 84 has a sealing lip 90. First and second seals 82 and 84 are oriented in opposite directions so that they sealingly enclose lubricant contained in lubrication annulus 86. It will be seen that first and second seals 82 and 84 characterize one embodiment of a sealing means disposed in the seal receiving means of seal carrier 56 for sealingly engaging plunger 14 and allowing a film of lubricant from lubrication hole 80 to be deposited on the plunger, as will be further discussed herein.

A spacer 92 is also disposed in packing sleeve 28, and end 93 of the spacer engages end 76 of seal carrier 56. Spacer 92 has an outside diameter 94 adapted for close, spaced relationship with second bore 32 in packing sleeve 28. Spacer 92 also has an annular recess 96 thereon which is spaced inwardly from second bore 32 in packing sleeve 28. Spacer 92 further defines a bore 98 therethrough which is approximately the same size as second bore 62 in seal carrier 56.

An angled hole 100 is defined in spacer 92, and hole 100 is substantially aligned with, or at least in communication with, longitudinal vent hole 74 in seal carrier 56. As seen in the lower half of FIG. 1, hole 100 thus provides communication between vent hole 74 in seal carrier 56 and recess 96 on spacer 92.

Still referring to FIG. 1, a threaded sleeve 102 is generally disposed in recess 20 of fluid end body 12 and has an end 104 which engages shoulder 24 in the fluid end body. Threaded sleeve 102 has an outwardly extending flange 106 defining a plurality of holes 108 therethrough. Each hole 108 is substantially aligned with a corresponding hole 110 in flange 22 in fluid end body 12. A pin 112 or other fastening means is disposed through each corresponding pair of holes 108 and 110 so that threaded sleeve 102 is locked against rotation with respect to fluid end body 12.

Threaded sleeve 102 has an external thread 114 thereon which is engaged by an internal thread 116 in a packing nut 118. Packing nut 118 has an end 120 which engages a corresponding end 122 of spacer 92. It will be seen by those skilled in the art that by appropriately turning packing nut 118 with respect to threaded sleeve 102, end 120 of the packing nut will be forced against end 122 of spacer 92. Thus, a clamping means is provided for rigidly clamping all of the components of packing assembly 10 together. Access to packing nut 118 is provided through an opening (not shown) in fluid end body 12. As nut 118 is adjusted, pins 112 prevent threaded sleeve 102 from rotating as previously mentioned.

OPERATION OF THE INVENTION

Referring to FIG. 1, during a pressure stroke of the pump, plunger 14 is moving to the left with respect to fluid end body 12, and the plunger is moving to the right during a suction stroke of the pump. A lubricant, such as oil, is pumped through lubrication port 44, opening 42, recess 78 and lubrication hole 80 to lubrication annulus 86 between first and second seals 82 and 84. First seal 82 is adapted to pass sufficient lubricant from annulus 86 to leave a thin film of the lubricant on plunger 14 during a pressure stroke. It will be seen by those skilled in the art that this film of lubricant is carried up to packing 52 so that the packing is lubricated as plunger 14 moves therethrough. In this way, packing assembly 10 comprises a lubrication means for providing lubricant to lubrication annulus 86 and plunger 14.

Because of the orientation of first seal 82, lip 88 therein "hydroplanes" over the thin film of lubricant during the suction stroke. This insures that the film is not wiped off plunger 14 on a suction stroke which could cause a build-up of oil between first seal 82 and packing 52.

Inevitably, there will be some discharge fluid blowby which moves past packing 52 toward seal carrier 56. Any discharge fluid blowby along the inside of packing ring 52 adjacent to plunger 14 will migrate to groove 68 in seal carrier 56. Similarly, any pressure fluid blowby between the outside of packing 52 and second bore 32 in packing sleeve 28 will migrate toward groove 70. The discharge fluid blowby will thus enter transverse hole 72 and longitudinal vent hole 74 in seal carrier 56 and eventually enter hole 100 and recess 96 in spacer 92. The fluid blowby then enters recess 20 in fluid end body 12 which is vented to the atmosphere.

The venting passageway means defined by grooves 68 and 70, holes 72, 74 and 100, and recesses 96 and 20 thus insures that any discharge fluid blowby past packing ring 52 will be vented to the atmosphere, and the lubrication annulus 86 will not be subjected to discharge fluid pressure because of this venting. In this way, the pump fluid discharge pressure cannot prevent the application of the thin film of lubricant on plunger 14 during the pressure stroke. As a result of this separation, the discharge fluid blowby is vented to the atmosphere before it can contaminate the lubricant or pressurize lubrication annulus 86.

It will be seen, therefore, that the lubricated pump packing assembly of the present invention is well adapted to carry out the ends and advantages mentioned as well as those inherent therein. While a presently preferred embodiment of the apparatus has been shown for the purposes of this disclosure, numerous changes in the arrangement and construction of parts may be made by those skilled in the art. All such changes are encompassed within the scope and spirit of the appended claims.

What is claimed is:

1. A packing apparatus for use in a plunger pump, said apparatus comprising:
   packing means for sealingly engaging a plunger of the pump;
   a seal carrier adjacent to said packing means, said seal carrier comprising:
   seal receiving means for receiving a seal therein;
   a vent passage defined through said seal carrier without communication with said seal receiving means, said vent passage being adapted for venting leakage of fluid past said packing means; and
   a lubrication passage defined in said seal carrier without communication with said vent passage, said lubrication passage being adapted for providing lubrication to said plunger adjacent to said seal receiving means; and
   sealing means disposed in said seal receiving means for sealingly engaging said plunger and allowing a film of lubricant from said lubrication passage to be deposited on said plunger.

2. The apparatus of claim 1 wherein said sealing means comprises a pair of spaced seals positioned on opposite sides of said lubrication passage.

3. The apparatus of claim 2 wherein each of said seals has a resilient lip thereon, said lips being positioned in opposite directions.

4. The apparatus of claim 1 further comprising a vent zone formed between said packing means and said vent passage.

5. The apparatus of claim 1 wherein said packing means and said seal carrier are disposed in a packing sleeve.

6. The apparatus of claim 5 further comprising clamping means for clamping said packing means and said seal carrier in said packing sleeve.

7. A packing apparatus for use in sealing a reciprocating plunger of a plunger pump, said apparatus comprising:
   packing means for sealingly engaging the plunger; and
   a gland adjacent to said packing means and defining:
   a groove on an outer surface thereof in communication with an outer portion of said packing means;
   a groove on an inner portion thereof in communication with an inner portion of said packing means; and
   a hole interconnecting said groove such that fluid leakage past said packing means moves toward said hole.

8. The apparatus of claim 7 wherein said gland further defines a vent passage in communication with said hole for venting said hole and grooves.

9. The apparatus of claim 7 further comprising clamping means for clamping said packing means and said gland in an operating position in said pump.

10. A packing apparatus for use in a plunger pump, said apparatus comprising:
- packing means for sealingly engaging a plunger of the pump;
- a single-piece seal carrier adjacent to said packing means, said seal carrier comprising:
  - a vent passage defined substantially longitudinally therein for venting leakage of fluid past said packing means; and
  - a lubrication passage isolated from said vent passage for providing lubrication to the plunger; and
- a seal disposed on opposite sides of said lubrication passage for sealingly engaging said plunger and allowing a film of lubricant from said lubrication passage to be deposited on said plunger.

11. The apparatus of claim 10 wherein said seal carrier defines a vent chamber between said packing means and said vent passage.

12. The apparatus of claim 10 wherein said packing means and said seal carrier are disposed in a packing sleeve.

13. The apparatus of claim 10 wherein said seals provide sealing in opposite directions from one another.

14. The apparatus of claim 10 further comprising clamping means for clamping said packing means and said seal carrier together.

15. A pump packing apparatus for use in a plunger pump, said apparatus comprising:
- packing means for sealingly engaging a plunger of the pump;
- a seal carrier adjacent to said packing means, said seal carrier comprising:
  - seal receiving means for receiving a seal therein;
  - a vent passage defined through said seal carrier without communication with said seal receiving means, said vent passage being adapted for venting leakage of fluid past said packing means; and
  - a lubricating passage defined in said seal carrier without communication with said vent passage, said lubrication passage being adapted for providing lubrication to said plunger adjacent to said seal receiving means;
- a vent zone formed between said packing means and said vent passage, said vent zone comprising:
  - annular grooves defined on inner and outer surfaces of said seal carrier; and
  - a hole defined in said seal carrier and interconnecting said grooves; and
- sealing means disposed in said seal receiving means for sealingly engaging said plunger and allowing a film of lubricant from said lubrication passage to be deposited on said plunger.

16. The apparatus of claim 15 wherein said hole is in communication with said vent passage.

17. A packing apparatus for use in a plunger pump, said apparatus comprising:
- packing means for sealingly engaging a plunger of the pump;
- a gland adjacent to said packing means and defining:
  - a groove on an outer surface thereof in communication with an outer portion of said packing means;
  - a groove on an inner surface thereof in communication with an inner portion of said packing means; and
  - a hole interconnecting said grooves such that fluid leakage past said packing means moves toward said hole;
- a pair of spaced seals disposed in said gland and defining a lubrication annulus therebetween adjacent to the plunger; and
- lubrication means for providing lubricant to said lubrication annulus.

18. The apparatus of claim 17 wherein said lubrication means comprises a lubrication passage between said seals.

19. The apparatus of claim 18 wherein said vent passage and said lubrication passage are isolated from one another.

20. A packing apparatus for use in a plunger pump, said apparatus comprising:
- packing means for sealingly engaging a plunger of the pump;
- a single-piece seal carrier adjacent to said packing means, said seal carrier comprising:
  - a vent passage defined substantially longitudinally therein for venting leakage of fluid past said packing means; and
  - a lubrication passage isolated from said vent passage for providing lubrication to the plunger;
  - wherein said seal carrier defines a vent chamber between said packing means and said vent passage, said vent chamber comprising:
    - an annular groove defined on an outer surface of said seal carrier;
    - another annular groove defined on an inner surface of said seal carrier; and
    - a substantially transverse hole defined in said seal carrier and interconnecting said grooves said hole being in communication with said vent passage; and
- a seal disposed on opposite sides of said lubrication passage for sealingly engaging said plunger and allowing a film of lubricant from said lubrication passage to be deposited on said plunger.

* * * * *